United States Patent

[11] 3,616,242

| [72] | Inventors | Andre Belloc<br>Hauts-de-Seine;<br>Yvan Charpentie, Paris; Jean Lunel, Paris;<br>Jean Preud'Homme, Paris, all of France |
|---|---|---|
| [21] | Appl. No. | 711,495 |
| [22] | Filed | Mar. 8, 1968 |
| [45] | Patented | Oct. 26, 1971 |
| [73] | Assignee | Rhone-Poulenc S.A.<br>Paris, France |
| [32] | Priority | Mar. 15, 1967 |
| [33] | | France |
| [31] | | 98967 |

[54] HYDROLYSIS PROCESS FOR THE PREPARATION OF RUBIDOMYCIN
9 Claims, No Drawings

[52] U.S. Cl. .................................................... 195/80, 424/123

[51] Int. Cl. .................................................... C12d 9/00
[50] Field of Search .......................................... 195/80; 424/116, 120, 123

[56] References Cited
OTHER REFERENCES
Chemical Abstracts, Vol. 60, 1964, p. 873b.

*Primary Examiner*—Joseph M. Golian
*Attorney*—Stevens, Davis, Miller & Mosher

ABSTRACT: The antibiotic rubidomycin, otherwise known as "13,057 R.P.," is obtained by subjecting the antibiotic 13,213 R.P. to acid hydrolysis at a temperature between 10° and 75° C. for a length of time of from 48 hours to 30 minutes, the length of time varying inversely with the temperature.

Rubidomycin and 13,213 R.P. are both described in British Pat. No. 985,598.

HYDROLYSIS PROCESS FOR THE PREPARATION OF RUBIDOMYCIN

This invention relates to a process for converting the antibiotic designated by the number 13,213, R.P. into the antibiotic rubidomycin (otherwise designated "13,057 R.P.") by hydrolysis in an acid medium.

The specification of British Pat. No. 985,598 describes the antibiotic designated by the number 9,865 R.P., its three principal constituents designated by the numbers 13,213 R.P., 13,057 R.P. and 13,330 R.P., the aglycone of 9,865 R.P. designated by the number 13,567 R.P., the preparation of the antibiotic 9,865 R.P. by cultivating aerobically "Streptomyces 8899" (NRRL 3046) or "Streptomyces 31,723 " (NRRL 3045) in an appropriate nutrient medium, and the separation of antibiotic 9,865 R.P. into its constituents, as well as the preparation of the aglycone of 9,865 R.P. by hydrolysis of 9,865 R.P. or of rubidomycin.

The antibiotic 9,865 R.P. on average contains 30 percent by weight of rubidomycin and 30 to 40 percent by weight of 13,213 R.P., but these percentages may vary within wide limits depending on the conditions under which 9,865 R.P. is prepared.

The two principal constituents of 9,865 R.P., i.e. 13,213 R.P. and rubidomycin, are of particular interest because of their very pronounced anti-cancer activity. 13,213 R.P., whilst being about 100 times as active as rubidomycin in animals, is also 100 times more toxic; furthermore 13,213 R.P. suffers from the disadvantage of not being crystalline whereas rubidomycin is easily crystallisable. It is therefore desirable to remove 13,213 R.P. from rubidomycin utilized in vivo.

The conversion of 13,213 R.P. to rubidomycin thus has the advantage of increasing the production of rubidomycin and of removing an undesirable substance from the finished produce suitable for therapeutic application.

The two constituents of 9,865 R.P. (13,213 R.P. and rubidomycin) contain the same chromophoric grouping or aglycone, designated by the number 13,567 R.P., and their constitution may be schematically represented as follows:

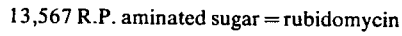

13,567 R.P. aminated sugar = rubidomycin

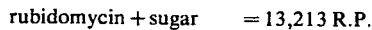

rubidomycin + sugar = 13,213 R.P.

Hydrolysis in an acid medium under appropriate conditions causes the following two reactions:

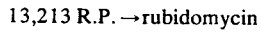

13,213 R.P. →rubidomycin

rubidomycin→13,567 R.P. + aminated sugar.

It is thus necessary to determine the conditions of transformation which make it possible to obtain the maximum amount of rubidomycin and the minimum amount of 13,567 R.P.

According to the present invention, a process for the preparation of rubidomycin comprises hydrolysing a solution of 13,213 R.P. with an acid in aqueous solution at a temperature between 10° and 75° C. for a length of time of from 48 hours to 30 minutes, the length of time varying inversely with the temperature, and separating rubidomycin from the reaction mixture by any of the usual methods for isolating and purifying antibiotics. The hydrolysis reaction is preferably carried out for a period of from 1 hour to 15 hours at a temperature of from 20° C. to 50° C., the length of time varying inversely with the temperature.

The 13,213 R.P. may be in aqueous solution or, as is preferred, in an organic or aqueous-organic solvent medium, or in a fermentation medium wherein the antibiotic has been formed by cultivating Streptomyces 8,899 or Streptomyces 31,723. Organic solvents which generally may be used are alcohols containing 1 to 4 carbon atoms such as methanol or butanol, ethers such as dioxan or tetrahydrofuran, ketones such as acetone or methyl ethyl ketone, esters such as ethyl acetate, chlorinated hydrocarbons such as methylene chloride or chloroform, or a mixture of these solvents.

The hydrolysis of 13,213 R.P. is effected with inorganic acids (e.g. hydrochloric, phosphoric and sulfuric acids) or organic acids (e.g. acetic and oxalic acids) at various concentrations, but hydrochloric acid or oxalic acid are preferably used at normalities of from 0.01N to 1N.

The concentration in the reaction medium of 13,213 R.P. to be converted to rubidomycin may vary from 0.01 percent 5 percent by weight.

It is necessary to be able to determine rubidomycin, 13,213 R.P. and 13,567 R.P. in aqueous, organic or aqueous-organic solutions, in the crude products, in the semipurified products and in the pure products in order to determine the optimum hydrolysis conditions and the composition of the final products.

The techniques for their determination are based on the differences in the physico-chemical and biological properties of the different constituents.

Partition chromatography on cellulose or absorption chromatography on silica gel in various solvent systems, such as mixtures of alcohols of low molecular weight and water, or mixtures of alcohols of low molecular weight, esters of aliphatic acids and water, may be used as rubidomycin, 13,213 R.P. and 13,567 R.P. have different Rf values.

As rubidomycin and 13,213 R.P. are naturally colored, it is possible to separate them by thin layer chromatography or by chromatography on a column, and either to determine them spectrographically in relation to a standard or, more simply to convert the separated products to the aglycone 13,567 R.P. by severe hydrolysis, to determine the percentage of the chromophoric group and hence to deduce the content of each of the constituents.

Furthermore, the biological activity in vitro of rubidomycin and 13,213 R.P. is different, and the aglycone is inactive. If, by definition, pure rubidomycin in the form of the base corresponds to 1,000 μg./mg. then pure 13,213 R.P. corresponds to 60,000 μg./mg. when determined turbidimetrically, using Klebsiella pneumoniae as the sensitive micro-organism. This difference makes it possible not only to carry out determinations on the crude products and on the solutions but also to detect very small quantities of 13,213 R.P. in purified batches of rubidomycin. In order to carry out these determinations, it is sufficient to chromatograph the products as indicated above and to develop the chromatograms by bioautography on a nutrient agar plate inoculated with Bacillus subtilis or Klebsiella pneumoniae.

The following Examples, in which the indicated temperatures are in degrees Centigrade, illustrate the invention. The yields given in the Examples are defined as follows:

$$\text{Yield} = \frac{\text{Weight of rubidomycin contained in the product obtained}}{\text{Weight of rubidomycin contained in the treated product}} \times 100$$

EXAMPLE I

Two solutions containing 5 mg./cc. of pure rubidomycin and of pure 13,213 R.P. are prepared in an ethyl acetate-methanol mixture (1:1 by volume). An amount of N-hydrochloric acid corresponding to 4 cc. per gram of antibiotic employed is added to each solution. The solutions are heated to 25° and that temperature is maintained with agitation. At certain intervals of time (1 hr., 4 hrs., 9 hrs. and 20 hrs.) 0.5 cc. of each of these solutions is withdrawn, and a precipitate formed by addition of diethyl ether (10 cc.). The resulting precipitates are filtered off, drained and dried. Their strength is measured by circular chromatography on Arches No. 302 paper impregnated with a phosphate buffer at pH 4.8 using n-butanol saturated with water as the development solvent. The visible zones corresponding to rubidomycin, 13,213 R.P. and 13,567 R.P. are cut out and eluted with a methanol-hydrochloric acid mixture (9:1 by volume; 5 cc.). The eluates are heated at 50° for 1 hour 30 minutes in order to hydrolyse the two constituents, namely rubidomycin and 13,213 R.P., to 13,567 R.P. The absorption of these solutions is measured at 480 nm. and the contents of rubidomycin, 13,213 R.P. and 13,567 R.P. are deduced therefrom.

The following table summarizes the results obtained:

| Product | Constituents determined | Percent yield determined as a function of time for— | | | | |
|---|---|---|---|---|---|---|
| | | 0 hr. | 1 hr. | 4 hrs. | 9 hrs. | 20 hrs. |
| Rubidomycin | Rubidomycin | 100 | 90 | 90 | 90 | 83 |
| | 13,567 R.P. | 0 | 10 | 10 | 10 | 17 |
| 13,213 R.P. | 13,213 R.P. | 95 | 79 | 66 | 59 | 35 |
| | Rubidomycin | 5 | 19 | 31 | 37 | 55 |
| | 13,567 R.P. | 0 | 2 | 3 | 4 | 10 |

EXAMPLE II

Two solutions containing 3.25 mg./cc. of pure rubidomycin and of pure 13,213 R.P., are prepared in a solvent mixture of ethyl acetate-methanol (1:1 by volume). An amount of N hydrochloric acid corresponding to 4 cc. per gram of product employed is added to each solution. The acidified solutions are heated to 37° and that temperature maintained with agitation. 30 Microlitres of each of the solutions are withdrawn at regular intervals of time (1 hr., 2 hrs., 4 hrs., 6 hrs., and 24 hrs.) and deposited on a thin layer of silica gel impregnated with a phosphate buffer at pH 7. The chromatograms are developed with the solvent phase of a mixture of n-butanol-ethyl acetate-water (5:5:2.5 volume). The zones of silica gel which contain the separated constituents are collected by scraping. These fractions of silica gel are eluted with a methanol-hydrochloric acid mixture (9:1 by volume). The eluates are heated at 50° for 1 hour 30 minutes in order to hydrolyse the two constituents, namely rubidomycin and 13,213 R.P., to give 13,567 R.P. The absorption of these solutions is measured at 480 nm and the contents of rubidomycin, 13,213 R.P. and 13,567 R.P. deduced therefrom.

The following table summarizes the results obtained:

| Product | Constituents determined | Percent yield determined as a function of time for— | | | | | |
|---|---|---|---|---|---|---|---|
| | | 0 hr. | 1 hr. | 2 hrs. | 4 hrs. | 6 hrs. | 24 hrs. |
| Rubidomycin | Rubidomycin | 100 | 85 | 70 | 55 | 47 | 17 |
| | 13,567 R.P. | 0 | 15 | 30 | 45 | 53 | 83 |
| 13,213 R.P. | 13,213 R.P. | 88 | 45 | 25 | 20 | 14 | 0 |
| | Rubidomycin | 8 | 40 | 55 | 50 | 46 | 18 |
| | 13,567 R.P. | 4 | 15 | 20 | 30 | 40 | 82 |

EXAMPLE III

Two solutions containing 5 mg./cc. of pure rubidomycin and of pure 13,213 R.P., are prepared in a methanol-ethyl acetate mixture (1:1 by volume). Amounts of N hydrochloric acid corresponding to 2 cc. and 8 cc. per gram of product employed respectively are added to aliquot fractions of these solutions. These solutions are treated as indicated in example II and the following table summarizes the results obtained.

| N HCl, cc./g | Product treated | Constituents determined | Percent yield determined as a function of time for— | | | | | |
|---|---|---|---|---|---|---|---|---|
| | | | 0 hr. | 1 hr. | 2 hrs. | 4 hrs. | 6 hrs. | 24 hrs. |
| 2 | Rubidomycin | Rubidomycin | 100 | 100 | 97 | 79 | | 55 |
| | | 13,567 R.P. | 0 | 0 | 3 | 21 | | 45 |
| | 13,213 R.P. | 13,213 R.P. | 98 | 78 | 67 | 36 | 20 | 0 |
| | | Rubidomycin | 1 | 20 | 30 | 54 | 66 | 75 |
| | | 13,567 R.P. | 1 | 2 | 3 | 10 | 15 | 25 |
| 8 | Rubidomycin | Rubidomycin | 100 | 98 | 95 | 85 | 75 | 45 |
| | | 13,567 R.P. | 0 | 2 | 5 | 15 | 25 | 55 |
| | 13,213 R.P. | 13,213 R.P. | 98 | 36 | 24 | 18 | | |
| | | Rubidomycin | 1 | 63 | 70 | 63 | 40 | 38 |
| | | 13,567 R.P. | 1 | 1 | 6 | 19 | 35 | 34 |

EXAMPLE IV

Eight fractions of 1 g. of crude antibiotic 9,865 R.P., containing 345 μg./mg. of rubidomycin and 400 μg./mg. of 13,213 R.P., are dissolved in eight quantities of 5 cc. of chloroform. To each fraction is added an n-butanol-6N hydrochloric acid mixture (96:4 by volume; 10 cc.). These solutions are heated to 20° or to 30° and maintained at that temperature with agitation. The composition of one fraction kept at 20° and of one fraction kept at 30° is determined at regular intervals of time (2, 3, 8, and 16 hours). For this purpose, an acetone-hexane mixture (1:1 by volume; 150 cc.) is added to each fraction in order to precipitate the rubidomycin and 13,213 R.P. The resulting products are filtered off, drained, dried and determined colorimetrically in order to evaluate the percentage of rubidomycin, and turbidimetrically with Klebsiella pneumoniae as the sensitive micro-organism in order to determine the content of 13,213 R.P.

The following table summarizes the results obtained:

| | | | Characteristics of the products obtained | | | | | |
|---|---|---|---|---|---|---|---|---|
| | | | Rubidomycin | | 13,213 R.P. | | Yield | |
| Temperature in °C. | Duration in hours | Weight, g. | Strength, μg./mg. | Weight, g. | Strength, μg./mg. | Weight, g. | Percent rubidomycin | Percent 13,213 R.P. |
| 20 | 0 | 1 | 345 | 0.345 | 400 | 0.400 | 100 | 100 |
| | 4 | 0.78 | 630 | 0.490 | 90 | 0.063 | 142 | 16 |
| | 8 | 0.78 | 670 | 0.520 | 68 | 0.053 | 150 | 13 |
| | 16 | 0.73 | 710 | 0.515 | 60 | 0.042 | 149 | 10 |
| 30 | 0 | 1 | 345 | 0.345 | 400 | 0.400 | 100 | 100 |
| | 2 | 0.7 | 665 | 0.465 | 76 | 0.053 | 135 | 13 |
| | 4 | 0.7 | 670 | 0.469 | 55 | 0.038 | 136 | 9.5 |
| | 8 | 0.72 | 670 | 0.480 | 41 | 0.029 | 139 | 7 |
| | 16 | 0.6 | 745 | 0.445 | 33 | 0.020 | 129 | 6 |

EXAMPLE V

A product (46 g.) containing 150 μg./mg. of rubidomycin, 650 μg./mg. of 13,213 R.P. and 200 μg./mg. of 13,567 R.P. (a residual product from the fractionation of 9,685 R.P. of which the greater part of the rubidomycin has been removed) is dissolved in a methanol-ethyl acetate mixture (1:1 by volume; 1,840 cc.). N hydrochloric acid (55 cc.) is added, and the temperature raised to 37° and maintained there, with agitation, for 10 hours. The solution is concentrated at 30° under reduced pressure (20 mm.Hg.) to 500 cc. Butanol (500 cc.) is added and the solution again concentrated to 500 cc. Addition of hexane (5,000 cc.) to the butanol solution so obtained causes a precipitate to form. The precipitate is filtered off, washed, drained and dried. A product (42 g.) is obtained, of which the properties are summarized in the table below:

| Products | Weight, g. | Properties | | | | | |
|---|---|---|---|---|---|---|---|
| | | Rubidomycin | | 13,213 R.P. | | 13,567 R.P. | |
| | | Strength, µg./mg. | Weight, g. | Strength, µg./mg. | Weight, g. | Strength, µg./mg. | Weight, g. |
| Untreated | 46 | 150 | 6.9 | 650 | 29.2 | 200 | 9.2 |
| Obtained after treatment | 42 | 440 | 18.5 | 310 | 13 | 250 | 10.5 |

EXAMPLE VI

The product obtained in example V (10 g.) is dissolved in the system of n-butanol-M/15 phosphate buffer at pH 6.5 (200 cc.). A counter-current distribution entailing 50 transfers is carried out in a 50 cell Craig apparatus. Three fractions (cells 0 to 14, 14 to 40 and 40 to 50 ) are made. The three fractions are treated identically. The aqueous phases are decanted and the butanol phases are diluted with hexane (1 volume) and extracted three times with ¼ of the volume of water. The aqueous extracts are combined and extracted twice, at pH 8, with ½ of the volume of chloroform. The mixture is washed at pH 8 with 1/10 of the volume of water. It is then concentrated to 100 cc. and a precipitate formed by the addition of hexane (1,000 cc.). The precipitates are filtered off, washed and dried.

The results obtained are summarized in the following table:

| Products | Weight, g. | Rubidomycin | | 13,213 R.P. | | 13,567 R.P. | |
|---|---|---|---|---|---|---|---|
| | | Strength, µg./mg. | Weight, g. | Strength, µg./mg. | Weight, g. | Strength, µg./mg. | Weight, g. |
| Untreated | 10 | 440 | 4.4 | 310 | 3.1 | 250 | 2.5 |
| Obtained | 1.5 | 910 | 1.36 | 60 | 0.09 | 30 | 0.045 |
| | 1.1 | 825 | 0.91 | 150 | 0.16 | 25 | 0.0275 |
| | 5.2 | 100 | 0.52 | 355 | 1.75 | 545 | 2.84 |

EXAMPLE VII

The product obtained in example VI (0.5 g.), containing 910 µg./mg. of rubidomycin, is dissolved in a dioxan-water mixture (8:2 by volume; 5 ml.). The pH is adjusted to 4 by addition of concentrated hydrochloric acid (0.1 cc.). Dioxan (35 cc.) is added slowly with continuous stirring, and rubidomycin hydrochloride crystallizes. The precipitate is filtered off, washed with dioxan (5 cc.) and dried at 45° under reduced pressure (0.5 mm.Hg). Rubidomycin hydrochloride (0.480 g.) is obtained; it has the following properties:

biological strength = 955 µg./mg.

elementary analysis: C=55.35%, H=6.45%, O =30.1%, N=2.55%, Cl =6.05%.

ultraviolet spectrum: (determined on a solution in 96 percent ethanol)

absorption maximum at 236 m$\mu$—$E_1^{1\%}$ cm. =645
absorption maximum at 250 m$\mu$—$E_1^{1\%}$ cm. =442
absorption maximum at 288 m$\mu$—$E_1^{1\%}$ cm. =150
absorption maximum at 472 m$\mu$—$E_1^{1\%}$ cm. =209
absorption maximum at 487 m$\mu$—$E_1^{1\%}$ cm. =209
absorption maximum at 523 m$\mu$—$E_1^{1\%}$ cm. =116

EXAMPLE VIII

Antibiotic 9,865 R.P. (463 g.) in the form of the crude base containing 330 µg./mg. of rubidomycin and 330 µg./mg. of 13,213 R.P. is dissolved in chloroform (2.3 l.). An n-butanol-6 N hydrochloric acid mixture (96:4 by volume; 4.6 l.) is added with stirring, and the solution is heated at 30° for 15 hours. A first crop of antibiotic hydrochloride is precipitated by addition of acetone (35 l.). This precipitate is filtered off, washed and dried. A second crop is obtained by addition of hexane (42.l.) to the mother liquors of the first crop. The precipitate is filtered off, washed and dried as in the case of the first crop.

The following Table summarizes the results obtained:

| Products | Weight, g. | Rubidomycin | | 13,213 R.P. | | Percent yield of rubidomycin |
|---|---|---|---|---|---|---|
| | | Strength, µg./mg. | Weight, g. | Strength, µg./mg. | Weight, g. | |
| Untreated | 463 | 330 | 153 | 330 | 153 | |
| Obtained: | | | | | | |
| 1st crop | 189 | 860 | 158 | 15 | 2.8 | 103} |
| 2nd crop | 58 | 532 | 32 | 10 | 0.5 | 19.5} 122.5 |

EXAMPLE IX

The hydrochloride obtained as described in example VIII (187 g.), containing 860 µg./mg. of rubidomycin and 15 µg./mg. of 13,123 R.P., is dissolved in methanol (360 cc.). Water (57 cc.) and dioxan (1.38 l.) are added. The mixture is clarified by decantation and slowly poured into dioxan (12.6 l.) with stirring, thereby causing crystallization. The crystalline hydrochloride product is filtered off, drained, washed and dried. A second crop is obtained by concentrating the mother liquors to 2 litres and adding hexane (2 l.). The product is isolated after filtering, washing and drying.

The following table summarizes the results obtained:

| Products | Weight, g. | Rubidomycin | | 13,213 R.P. | | Percent yield of rubidomycin |
|---|---|---|---|---|---|---|
| | | Strength, µg./mg. | Weight, g. | Strength, µg./mg. | Weight, g. | |
| Untreated | 187 | 860 | 161 | 15 | | |
| Obtained | 132 | 940 | 124 | ≤5 | ≤0.6 | 77} |
| | 51 | 580 | 29.5 | 15 | 0.76 | 18.4} 95.4 |

The rubidomycin hydrochloride thus obtained is identical to that obtained in example VII.

EXAMPLE X

A broth (200 l.) is divided into two identical fractions A and B, containing 43.8 μg./ml. of rubidomycin and 30 μg./ml. of 13,213 R.P. Fraction A is subjected to an acid hydrolysis and fraction B, which is not subjected to an acid treatment, serves as a comparison standard.

Oxalic acid (30 g./l.) is added to fraction A. This mixture is heated to 50°, and maintained at that temperature for 1 hour, and then filtered in the presence of a filtration aid. The product is washed with water at 50° and the filtrate thus obtained (123 l.) is cooled to =5°. The pH is adjusted to 4.5.

The broth fraction B is filtered in the presence of a filtration aid, and the mycelium containing all the activity is taken up in a methanol-water mixture (6.3 by volume; 90 l.) containing oxalic acid (2 kg.). This mixture is stirred for half an hour, and filtered. The filter cake is taken up in a methanol-water mixture (3:2 by volume; 50:1.) containing oxalic acid (1 kg.). The mixture is stirred for half an hour, and filtered. Washing is carried out with a methanol-water mixture (1:1 by volume; 20 l.). The combined filtrates and washings (165 l.) thus obtained are cooled to +5° and neutralized to pH 4.5.

The filtrates A and B are thereafter separately treated as follows:

Each filtrate is passed through a column containing Amberlite IRC 50 (5 l.) in the acid form. The filtrate passes upwards through the Amberlite bed at a rate of 15 litres/hour. The column is thereafter washed with water (50 l.) in the case of filtrate A and with 50 percent methanol (50 l.) in the case of filtrate B, using 15 litres/hour circulating upwards, and then with a solution of methanol containing 10 percent of water (75 l.) circulating downwards at a rate of 15 litres/hour.

The washings are discarded, and the column is then eluted with a solution of the following composition: sodium chloride (10 g.), water (100 cc.) and methanol sufficient to make up 1,000 cc. The eluate, which contains the greater part of the antibiotic, has a volume of 40 litres. It is concentrated to a volume of 5 litres under reduced pressure (20 mm.Hg.) at 35°. The concentrate is twice extracted with chloroform (5 l.) at pH 7.5. The chloroform extract is adjusted to pH 4 by means of a solution of acetic acid in chloroform (1:10 by volume) and then concentrated at 30° under reduced pressure (20 mm.Hg.) to a volume of 20 cc. The antibiotic is precipitated with hexane (2 litres), filtered off, washed and dried.

The results obtained are summarized in the following table:

| Various phases | Volume (l.) or weight (g.) | Rubidomycin | | 13,213 R.P. | | Yield, percent | |
| --- | --- | --- | --- | --- | --- | --- | --- |
| | | strength, μg./ml. or μg./mg. | Weight, g. | Strength, μg./ml. or μg./mg. | Weight, g. | Rubidomycin | 13,213 R.P. |
| Broth A or B | [1] 100 | 43.8 | 4.38 | 30 | 3 | | |
| Filtrate A | [1] 123 | 47.2 | 5.8 | 6.9 | 0.85 | 132 | 28 |
| B taken up again | [1] 165 | 26 | 4.3 | 17.5 | 2.9 | 98 | 96 |
| Product A | [2] 5.45 | 875 | 4.78 | 120 | 0.65 | 110 | 21.5 |
| Product B | [2] 7 | 510 | 3.57 | 325 | 2.28 | 81.5 | 76 |

[1] Litres.
[2] Grams.

We claim:
1. Process for converting the antibiotic 13,213 R.P. into rubidomycin which comprises treating a solution containing 13,213 R.P. with an acid in aqueous solution for between 48 hours at 10° C. and 30 minutes at 75° C. to hydrolyse 13,213 R.P. to rubidomycin, and separating rubidomycin from the solution.
2. Process according to claim 1 in which the solution of 13,213 R.P. is treated with an acid selected from hydrochloric, phosphoric, sulfuric acetic and oxalic acids in aqueous solution.
3. Process according to claim 1 in which the solution of 13,213 R.P. is treated with an acid selected from hydrochloric and oxalic acids in aqueous solution.
4. Process according to claim 3 in which the solution of 13,213 R.P. is treated with a 0.01N to 1N aqueous solution of the acid.
5. Process according to claim 1 in which treatment of the solution of 13,213 R.P. with an acid in aqueous solution is carried out for between 15 hours at 20° C. and 1 hour at 50° C.
6. Process according to claim 1 in which 13,213 R.P. is in solution in at least one organic solvent selected from alcohols containing 1 to 4 carbon atoms ethers, ketones, esters and chlorinated hydrocarbons.
7. Process according to claim 1 in which 13,213 R.P. is in solution in at least one organic solvent selected from methanol, butanol, dioxan, tetrahydrofuran, acetone, methyl ethyl ketone, ethyl acetate, methylene chloride and chloroform.
8. Process according to claim 1 in which 13,213 R.P. is in solution in a fermentation medium wherein the antibiotic has been formed by cultivating Streptomyces 8,899 (NRRL 3,046) or Streptomyces 31,723 (NRRL 3,045).
9. Process according to claim 1 in which the solution of 13,213 R.P. treated with the aqueous acid contains from 0.01 percent to 5 percent by weight of 13,213 R.P.